No. 836,446. PATENTED NOV. 20, 1906.
A. & K. KAUDELA.
BAND SAW GUIDE.
APPLICATION FILED MAY 29, 1905.
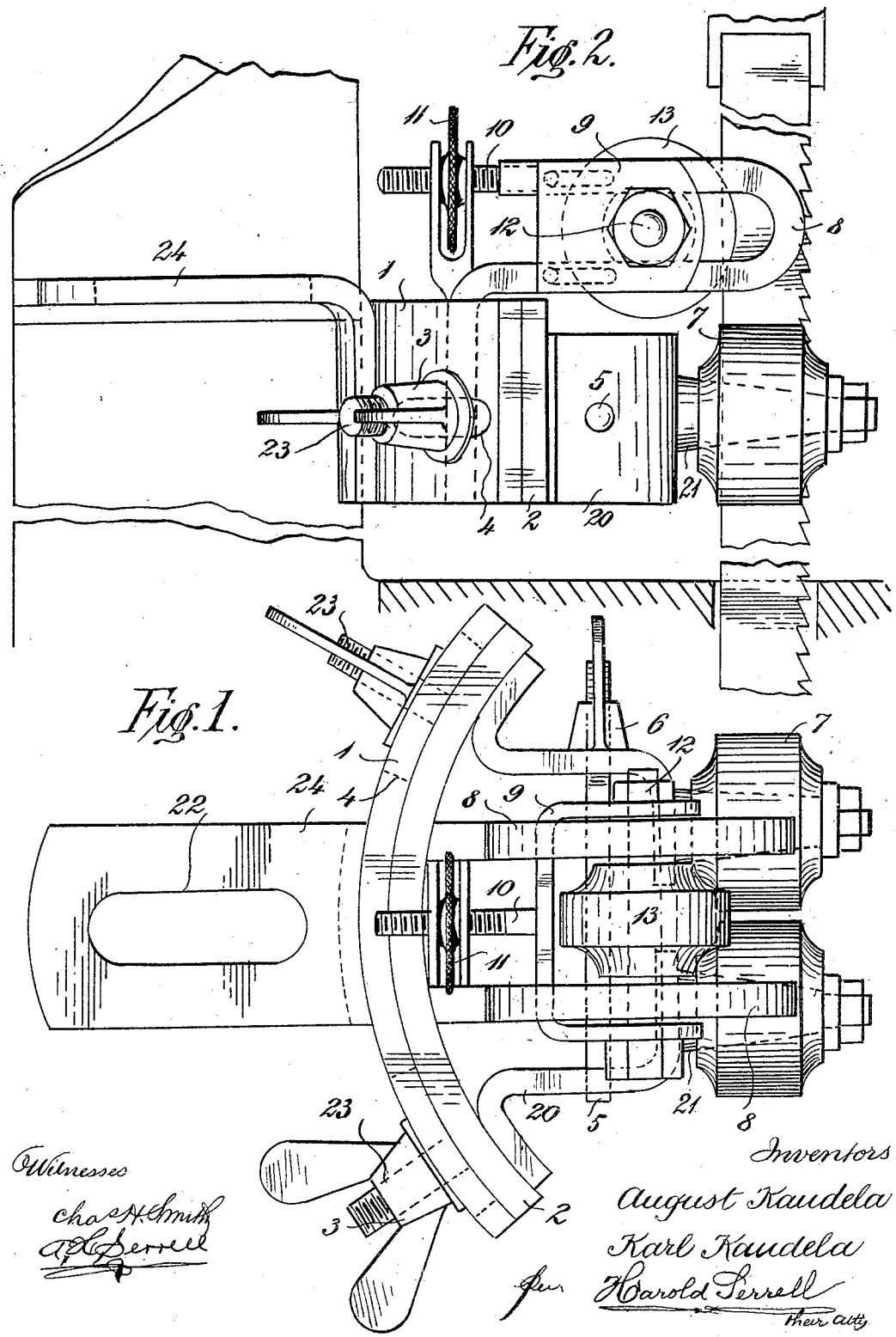

UNITED STATES PATENT OFFICE.

AUGUST KAUDELA AND KARL KAUDELA, OF UNTER-STINKENBRUNN, NEAR LAA, AUSTRIA-HUNGARY.

BAND-SAW GUIDE.

No. 836,446.

Specification of Letters Patent.

Patented Nov. 20, 1906.

Application filed May 29, 1905. Serial No. 262,792.

*To all whom it may concern:*

Be it known that we, AUGUST KAUDELA and KARL KAUDELA, manufacturers, subjects of the Emperor of Austria-Hungary, residing at Unter-Stinkenbrunn, near Laa-on-the-Thaya, Lower Austria, Empire of Austria-Hungary, have invented certain new and useful Improvements in Band-Saw Guides; and we do hereby declare the following to be a full, clear, and exact description of the invention, such as will enable others skilled in the art to which it appertains to make and use the same.

In band-saws the teeth are frequently worn irregularly, so that the cutting edges at the points of the teeth are not exactly at right angles to the plane of the band, but oblique thereto or slightly curved. The band-saw is then liable to cut wrong, so that the direction of the cut produced by the saw is deflected from the correct one to the side at which the teeth are less worn.

The main object of the present invention is to provide guides which are so adjustable that this deflection of the direction of the cut may be readily obviated; and a further object of the invention is to provide cheap, compact, and reliable band-saw guides readily adjustable to compensate for any wear thereof. As usual, two guides are employed, one arranged above the table and the other in or below the table, and both guides being of substantially the same construction.

In the accompanying drawings, Figure 1 is a plan view, and Fig. 2 a side elevation, of a guide constructed in accordance with our invention.

Referring now to the drawings, 1 is a block which may be carried in any known manner by a suitable support. (Not shown.) As illustrated, we employ a lug 24, securely attached to the block 1 and provided with an elongated slot 22, by means of which, together with a bolt, (not shown,) the said lug and block may be secured to the support, so as to be adjustable horizontally. The front side of the block forms a segment of a hollow cylinder, the axis of which coincides with the cutting edge of the band-saw.

2 is a segment concentric to and adapted to slide on the front side of the block 1.

3 represents clamping-nuts secured upon bolts 23, projecting from the segment 2, through slots 4 in the block 1, so that by means of these bolts the segment 2 may be adjusted on the block 1 and then locked in position, the movement of the segment in the block being limited by the slots 4.

20 represents two plates bent at right angles and secured to the segment 2 by screws, rivets, or any other suitable means.

5 is a bolt passing through the plates 20, and 6 is a nut screwing on such bolt, the said plates being sufficiently elastic to enable their free ends to slightly approach each other or to recede from each other when the nut 6 is turned in the one or in the other direction, respectively.

21 represents cones on the free end of the plates 20, serving as journals for rollers 7 7, serving as guide-rollers for the two sides of the band-saw. In case of wear of the conical bore of the rollers 7 7 they may be brought to a snug fit upon the conical journals 21 by forcing them toward the broader ends of the latter by means of nuts screwing on the outer ends of the same.

8 represents guides secured to the segment 2. 9 is a slide movable horizontally along such guides toward and from the back of the band-saw.

10 is a screw secured to the slide 9, and 11 is a milled nut held in the guides 8 against movement in the direction of the axis of the screw and screwed on the latter.

12 is a horizontal spindle at right angles to the axes of the journals 21 and supports the guide-roller 13 for the back of the band-saw. By turning the nut 11 in the one or in the other direction the slide 9, with the guide-roller 13, may be moved forward and backward.

The operation of the band-saw guides hereinbefore described is as follows: When, owing to irregular wear of the teeth, the saw tends to cut wrong, as above indicated, it is only necessary to loosen the nuts of the bolts 3 and to turn the segment 2 in the block 1 around their common axis—that is to say, around the toothed edge of the band-saw blade—as an axis whereby the rollers 7 7, guiding the sides of the band-saw, turn the latter around its toothed edge, thereby imparting the slight twist to the band-saw blade. The adjustment is so made that the angle through which the band-saw blade is turned is equal but opposite to the deflection of the direction of the cut from the correct one, whereby such deflection is entirely eliminated. By operating the nut 6 the rollers 7 may be adjusted relatively to each other according to the thickness of the band-saw, while the back guide-roller 13 may be adjusted as required by shifting the slide 9 by means of the screw 10 and nut 11.

Generally speaking, the essence of our invention consists in so combining devices adapted to guide the band-saw blade with a device adapted to turn the blade round its toothed edge that by properly adjusting the latter device the required twist may be imparted to the band-saw blade for preventing the band-saw from cutting wrong, as above explained.

We claim—

In a band-saw guide, the combination of a pair of rollers guiding the sides of the band-saw blade, spring-plates carrying the journal for such guide-rollers, means for moving such plates toward and from each other, a roller for guiding the back of the band-saw blade, a segment for supporting the said spring-plates and the roller for guiding the back of the band-saw, the axis of such segment coinciding with the line of the toothed edge of the band-saw blade, means for permitting said segment to turn round its axis whereby a twist is imparted to said blade, means for locking such segment in position and means for adjusting the said back guide-roller at right angles to the said segment, substantially as and for the purpose described.

In testimony whereof we affix our signatures in presence of two witnesses.

AUGUST KAUDELA.
KARL KAUDELA.

Witnesses:
ARTHUR BAUMANN,
ALVESTO S. HOGUE.